UNITED STATES PATENT OFFICE.

JAMES CREW, OF CHARLESTON, WEST VIRGINIA, ASSIGNOR OF ONE-THIRD TO JESSE CREW AND ONE-THIRD TO JOSEPH BYRON WEHRLE, BOTH OF CHARLESTON, WEST VIRGINIA.

COMPOSITION OF MATTER TO BE USED FOR THE WELDING OF COPPER.

No. 906,202.  Specification of Letters Patent.  Patented Dec. 8, 1908.

Application filed July 23, 1907. Serial No. 385,232.

*To all whom it may concern:*

Be it known that I, JAMES CREW, a citizen of the United States, residing at Charleston, in the county of Kanawha and State of West Virginia, have invented a new and useful Composition of Matter to be Used for the Welding of Copper, of which the following is a specification.

My composition consists of the following ingredients, combined in the proportions stated, viz: borax, 10 parts; carbonate of iron, 8 parts; alum, 3 parts. These ingredients are to be thoroughly mixed together.

In using the above named composition a suitable amount should be placed on the joints or ends of the copper intended to be welded, after first heating the copper to a sufficient heat, and then hammering the joint together as in welding iron.

By the use of the above composition copper can be welded or joined together so that a perfect weld can be obtained.

I claim:

1. The herein described composition of matter for welding copper, consisting of borax, carbonate of iron and alum, substantially as described.

2. The herein described composition of matter for welding copper, consisting of borax, ten parts, carbonate of iron eight parts, and alum three parts, substantially as described.

JAMES CREW.

Witnesses:
GEO. W. BELLER,
M. B. MAFOR.